United States Patent
Andoh et al.

(10) Patent No.: US 8,342,338 B2
(45) Date of Patent: Jan. 1, 2013

(54) SEPARATOR FOR SEPARATING SOLIDS FROM AN INFLUENT

(75) Inventors: Robert Yaw Gyamfi Andoh, South Portland, ME (US); Jeremy Fink, Portland, ME (US); Michael Guy Faram, Bristol (GB); Paul Stephen Barter, Ely (GB)

(73) Assignee: Hydro International plc, Clevedon (GB)

( * ) Notice: Subject to any disclaimer, the term of this patent is extended or adjusted under 35 U.S.C. 154(b) by 268 days.

(21) Appl. No.: 12/728,924

(22) Filed: Mar. 22, 2010

(65) Prior Publication Data

US 2011/0226693 A1 Sep. 22, 2011

(51) Int. Cl.
*B01D 21/02* (2006.01)
*B01D 21/24* (2006.01)
(52) U.S. Cl. ............... 210/519; 210/521; 210/532.1
(58) Field of Classification Search ............ 210/519, 210/521, 522, 532.1, 541, 801, 802
See application file for complete search history.

(56) References Cited

U.S. PATENT DOCUMENTS

| | | | | | |
|---|---|---|---|---|---|
| 554,815 | A | * | 2/1896 | Field | 210/521 |
| 2,230,386 | A | * | 2/1941 | Pecker | 210/521 |
| 2,570,304 | A | * | 10/1951 | Bach | 210/802 |
| 3,239,066 | A | * | 3/1966 | Schick | 210/521 |
| 3,879,296 | A | | 4/1975 | Schneider | |
| 4,816,146 | A | * | 3/1989 | Schertler | 210/522 |
| 4,921,609 | A | * | 5/1990 | Fromson | 210/521 |
| 4,971,692 | A | * | 11/1990 | Sklokin et al. | 210/521 |
| 5,198,108 | A | * | 3/1993 | Savall et al. | 210/521 |
| 6,183,634 | B1 | * | 2/2001 | Du Toit et al. | 210/521 |
| 6,645,382 | B1 | | 11/2003 | Wilson | |
| 6,852,239 | B2 | | 2/2005 | Wilson | |
| 6,881,350 | B2 | | 4/2005 | Wilson | |
| 6,942,796 | B2 | * | 9/2005 | Lacasse et al. | 210/521 |

OTHER PUBLICATIONS

International Search Report for PCT/GB2011/050563, Jul. 5, 2011, European Patent Office, Rijswijk, Netherlands.

* cited by examiner

*Primary Examiner* — Christopher Upton
(74) *Attorney, Agent, or Firm* — Stites & Harbison PLLC; Marvin Petry

(57) ABSTRACT

A separator 2 for separating solids, such as grit, from an influent, such as water, the tray assembly 4 comprising a plurality of nested tray units 14 which are spaced apart from one another along a vertical separator axis 16. Each tray unit 14 comprises a substantially conical tray 18, an aperture 20 in the apex of the tray 18, and a means for restricting flow through the respective aperture 20, such as a baffle 22 disposed at or adjacent the aperture 20. In use, grit is separated from water circulating among the trays 18 and falls through successive apertures 20 in each of the trays to exit through the bottom of the tray assembly 4. The baffles 22 restrict upward flow through the apertures 20 in the trays 18 thereby reducing agitation of the grit.

22 Claims, 14 Drawing Sheets

SEPARATOR FOR SEPARATING SOLIDS FROM AN INFLUENT

This invention relates to a separator for separating solids from an influent, and is particularly, although not exclusively, concerned with a separator for removing grit from wastewater flow.

Wastewater such as that arriving at a sewage treatment facility can contain grit which causes wear to processing equipment and, if the grit accumulates, loss of performance.

A separator for the removal of grit from wastewater flow is described in U.S. Pat. No. 6,645,382. The separator comprises a tray assembly made up of a plurality of stacked settling plates, in the form of trays having a frusto-conical shape. Each tray has a centrally located opening and a lip which extends about the periphery of the tray and projects inwardly. The trays are spaced apart axially so that wastewater may flow between the trays. The stacked trays are submerged in a vessel, such as a grit basin. An influent duct channels wastewater in between the trays and ensures that the wastewater is distributed evenly across the tray stack. The influent duct is arranged to provide a tangential inlet such that a low energy vortex flow is established between adjacent trays. The low energy vortex allows grit particles entrained by the flow to settle on the sloping inner surface of each tray whereupon the particles gravitate towards and pass through the openings in the trays. The grit falls through the openings in underlying trays and out through the bottom of the tray assembly. The grit collects at the bottom of the separator from where it is removed as a concentrate. De-gritted wastewater flows out over the lips of the trays into the grit basin for further processing.

Under some operating conditions, upward flow through the tray assembly can agitate the settled grit, causing it to be re-entrained in the flow. This reduces the separation efficiency of the separator.

According to a first aspect of the present invention, there is provided a separator for separating solids from a fluid, comprising a tray assembly, the tray assembly comprising a plurality of nested tray units which define a separator axis and are spaced apart from one another along the separator axis, each tray unit comprising a substantially conical tray which is aligned along the separator axis, an aperture in the tray disposed at the separator axis, and means for restricting flow through the respective aperture.

By "substantially conical" is meant that the tray is a body of revolution which converges in the direction of the axis of revolution from a wider end to a narrower end. The tray need not have a strictly conical shape but may, for example, be curved or stepped between its wider and narrower ends.

The means for restricting flow through the respective aperture may comprise a baffle.

The baffle may be arranged with respect to the conical tray to define an annular flow passage having a flow area which is not greater than the flow area of the respective aperture.

The baffle may disposed at or adjacent the aperture and may, for example, be disposed below or above the respective aperture. The baffle may be disposed such that it projects through the respective aperture.

The baffle of each tray unit may be conical and may comprise a hollow cone having an open base. The conical baffle may converge in a direction opposite to the direction of convergence of the respective tray.

Each baffle may have a conical external surface and each tray may have an inner peripheral edge defining the aperture, the inner peripheral edge of the tray and the conical external surface of the baffle defining the annular flow passage. The flow area of the annular passage may be measured in a plane perpendicular to the conical external surface of the baffle.

Each baffle may have an outer peripheral edge and each tray may have a conical inner surface, the outer peripheral edge of the baffle and the conical inner surface of the tray defining the annular flow passage. The flow area of the annular passage may be measured perpendicular to the conical inner surface of the tray.

The baffle of each tray unit may be spherical.

The baffles may be suspended by a rod that extends along the separator axis. The rod may be tubular.

The baffle may be disposed on an upper tray of two adjacent trays and project from an outer surface of the upper tray towards an inner surface of the lower tray thereby defining the annular flow passage between the outer peripheral edge of the baffle and the inner surface of the lower tray.

The baffle may project in a direction which is perpendicular to the inner surface of the lower tray or in a direction which is parallel with the separator axis.

The means for restricting the flow may comprise a profiled section of the tray which is arranged with respect to an adjacent upper tray to define an annular flow passage between the trays, the annular passage having a flow area which is not greater than the flow area of the respective aperture.

The tray assembly axis may extend upwardly and each tray may converge in a downwards direction.

According to a second aspect of the invention, there is provided a wastewater treatment device comprising a vessel, a separator disposed in the vessel, wherein the separator comprises a tray assembly, the tray assembly comprising a plurality of nested tray units which define a separator axis and are spaced apart from one another along the separator axis, each tray unit comprising a substantially conical tray which is aligned along the separator axis an aperture in the tray disposed at the separator axis, and means for restricting flow through the respective aperture.

According to a third aspect of the invention, there is provided a tray unit for a separator, comprising a substantially conical tray which defines a tray unit axis, an aperture in the tray disposed at the tray unit axis, and means for restricting flow through the aperture.

For a better understanding of the present invention, and to show more clearly how it may be carried into effect, reference will now be made, by way of example, to the accompanying drawings, in which.

Figure 1:
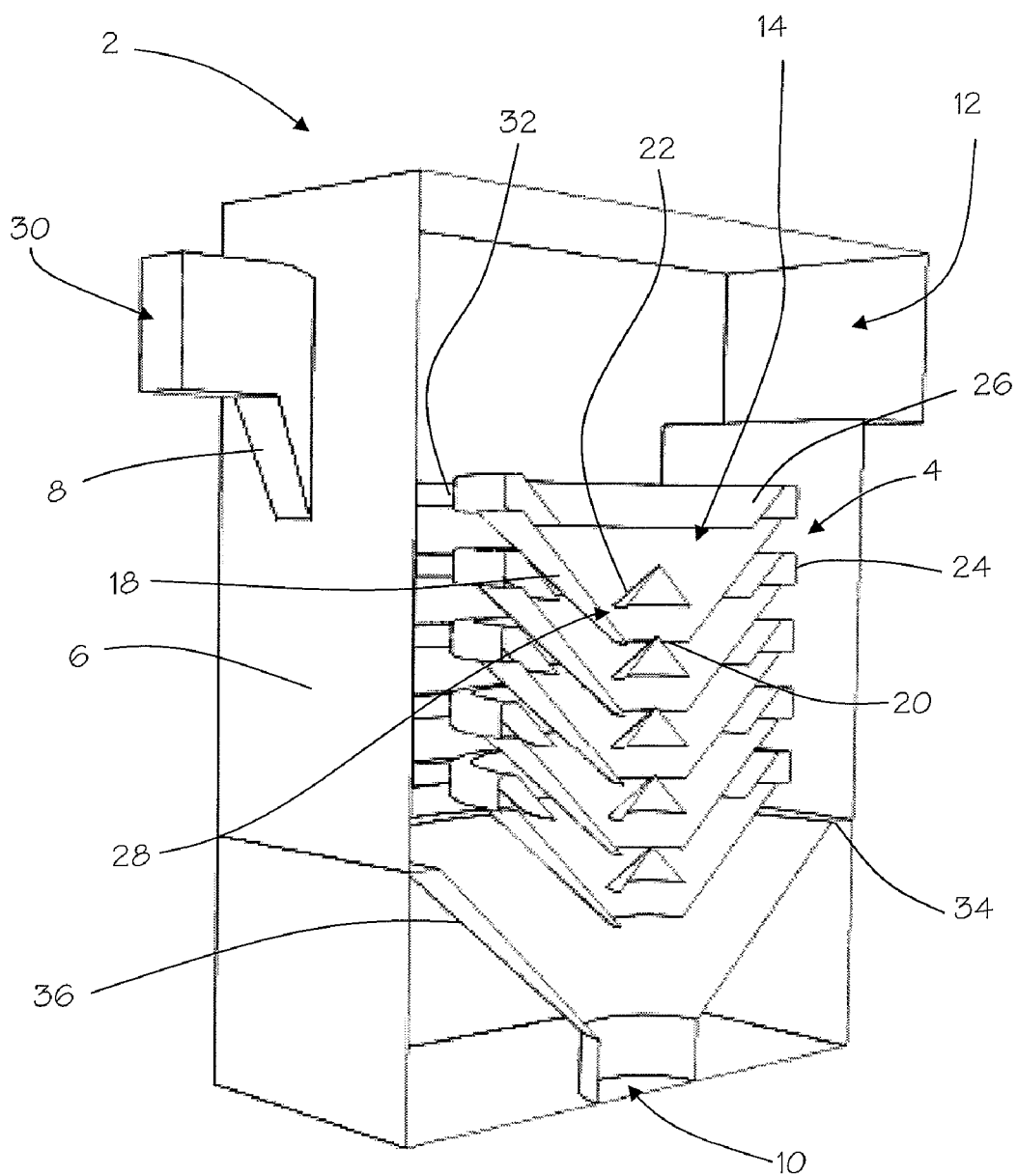
FIG. 1 is a perspective sectional view of a separator comprising a separator tray assembly according to a first embodiment of the invention.

FIG. 1 shows a separator 2 comprising a tray assembly 4 disposed within a treatment vessel 6. The tray assembly 4 comprises a plurality of nested tray units 14. Five tray units 14 are shown in FIG. 1, but it will be appreciated that the tray assembly could comprise more or fewer tray units 14. The nested tray units 14 define a separator axis 16, shown in FIGS.

2, 3 and 5, which is upright and preferably substantially vertical. The tray units 14 are spaced apart from each other along the axis 16. The treatment vessel 6 is provided with an inlet chute 8, a grit outlet 10 and a fluids outlet 12.

Each tray unit 14 comprises a frusto-conical tray 18, having a circular aperture 20 at the apex of the tray 18, and a baffle 22. The axis of the conical shape of the tray 18 is aligned with the separator axis 16. The tray 18 converges in a downward direction and the baffle 22 is disposed immediately above the aperture 20. The baffle 22 may be supported by the tray 18 by suitable struts and may, for example, be formed integrally with the tray 18 or may be supported independently of the trays 18, for example by a pole or rod that passes along the separator axis 16. The aperture 20 and the baffle 22 are aligned with the separator axis 16. The flow area of the aperture 20 is defined as the area of the aperture 20. A cylindrical rim 24 extends upwardly from the outer periphery of the tray 18 and an annular lip 26 extends radially inwardly from the extremity of the rim 24. The radially inward portion of the annular lip 26 is inclined so as to be parallel to the direction of the upper surface of the tray 18. The rim 24 and annular lip 26 may be formed integrally with the tray 18 by a folded over portion of the tray 18. The rim 24 and annular lip 26 can be separately manufactured and assembled with the tray 18, or can be formed integrally with the tray 18, for example, when the tray is a plastics moulding.

Figure 5:
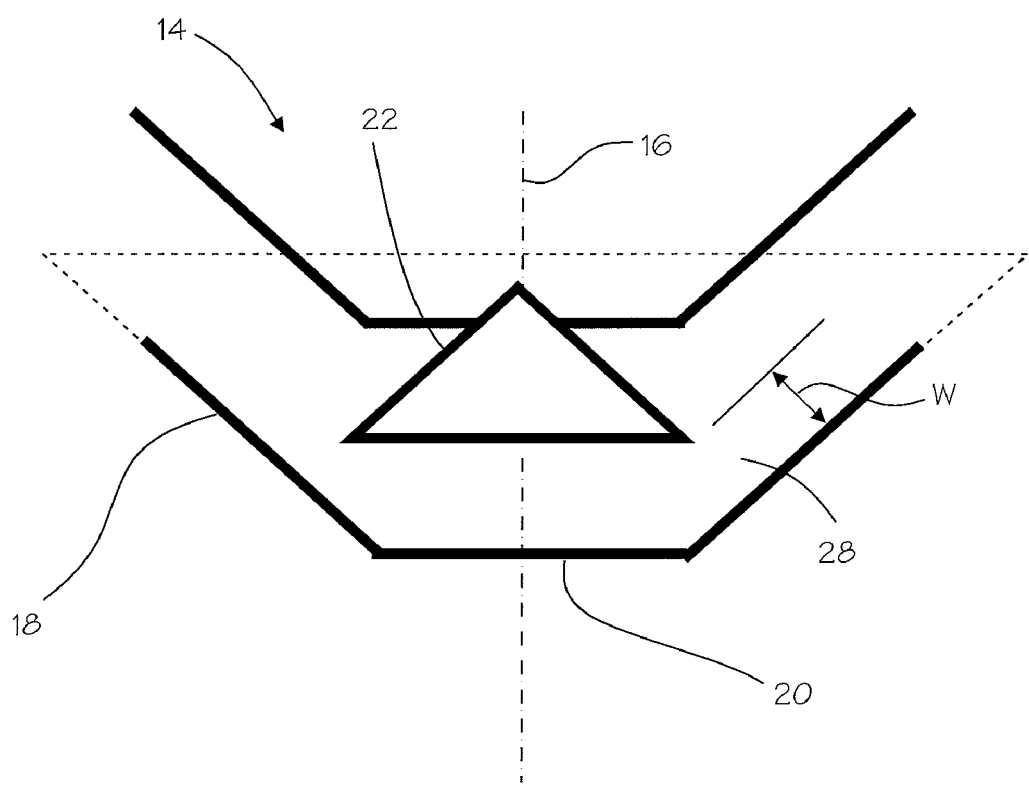
FIG. 5 is an enlarged partial sectional view of a tray unit of the separator shown in FIG. 1, FIG. 6 corresponds to FIG. 2 but shows a separator tray assembly according to a second embodiment of the invention.

The baffle 22 comprises a hollow cone having an open base. The diameter of the base of the baffle 22 is greater than the diameter of the aperture 20. The baffle 22 converges upwardly, i.e. in a direction opposite to the direction of convergence of the tray 18. The baffle 22 thus defines an annular passage 28 between the outer peripheral edge of the baffle 22 and the conical inner surface of the tray 18. The passage 28 is shown more clearly in FIG. 5. The width W of the annular passage 28 is measured perpendicular to the conical inner surface of the tray 18. The flow area of the passage 28 is defined as the area of the passage 28 across its width W. The flow area of the annular passage 28 is not greater than the flow area of the aperture 20. It will be appreciated that the flow area of the annular passage 28 may be determined in accordance with the amount of restriction which is to be provided by the baffle 22 for particular operating requirements.

Figure 2:
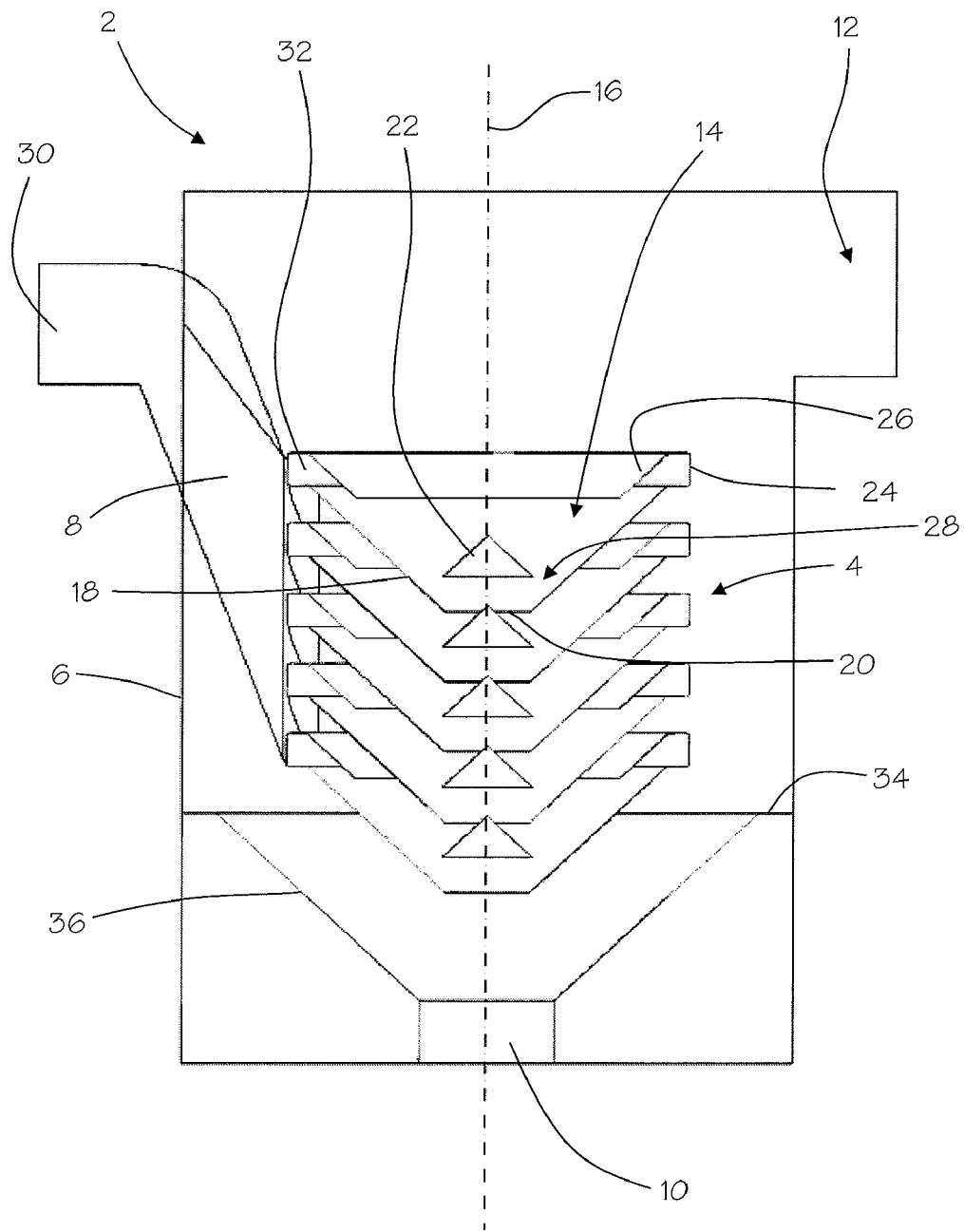
FIG. 2 is a sectional view of the separator shown in FIG. 1.
Figure 3:
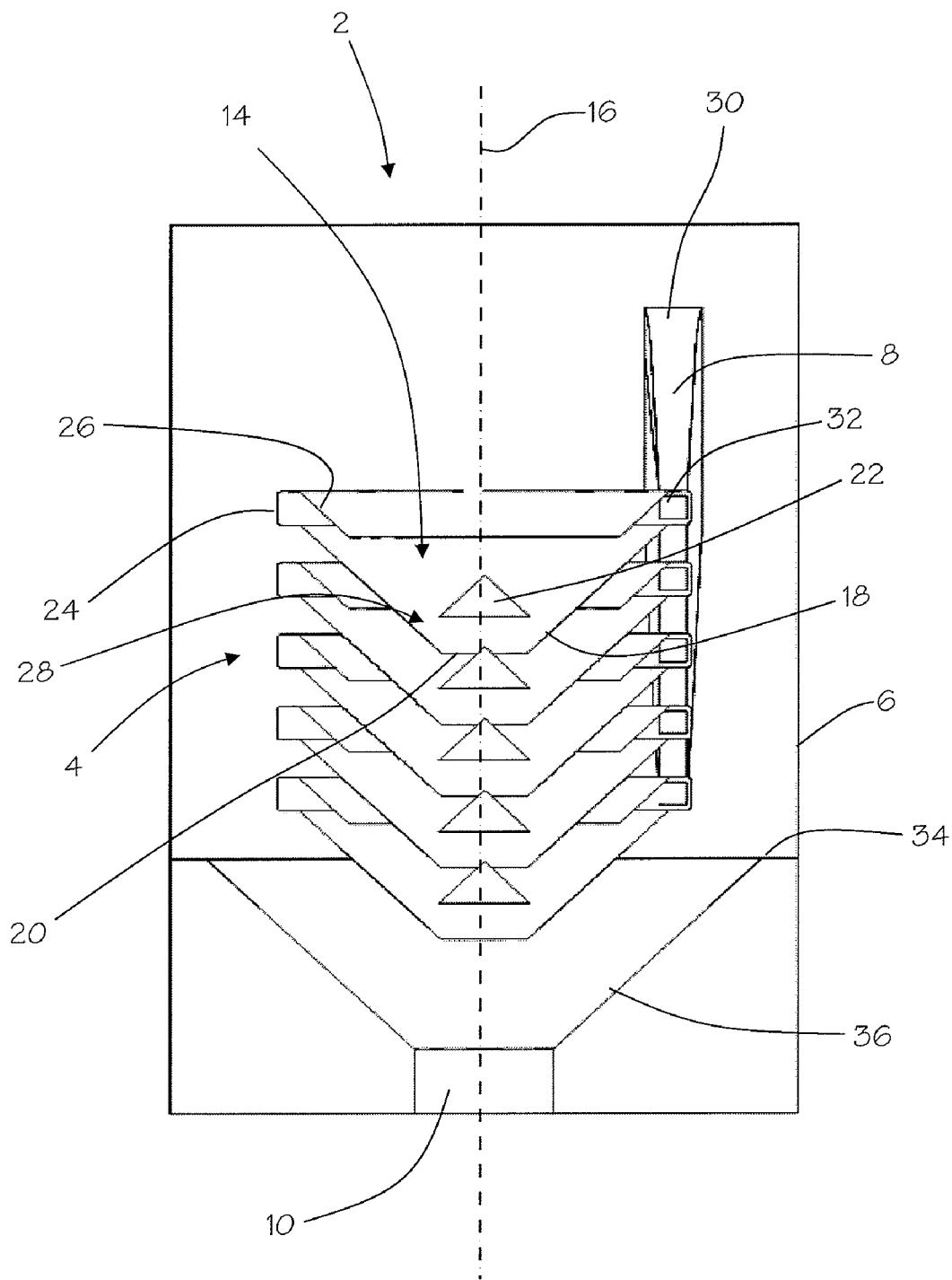
FIG. 3 is a sectional view of the separator shown in FIG. 1 taken in a direction perpendicular to that of FIG. 2.
Figure 4:
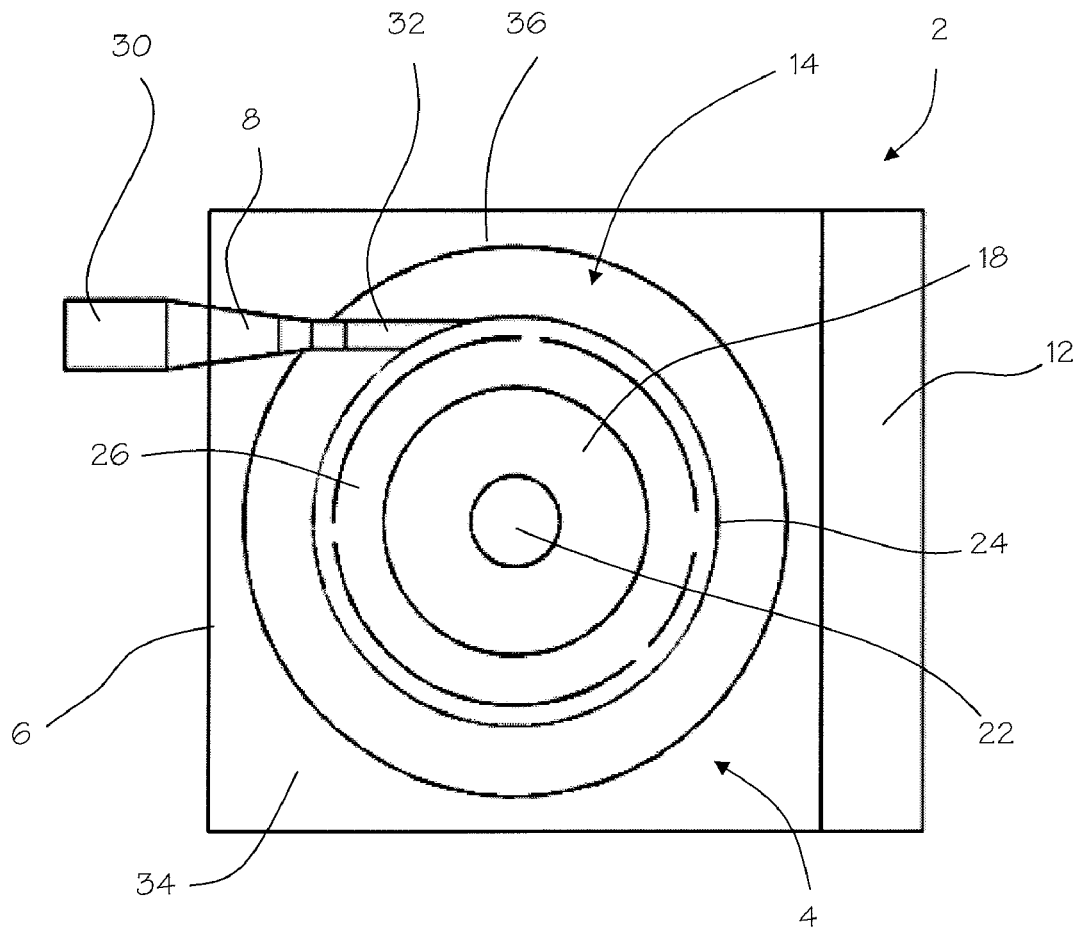
FIG. 4 is a sectional plan view of the separator shown in FIG. 1.

Referring to FIGS. 2 and 3, the inlet chute 8 has a single inlet 30 and a plurality of outlets 32. The chute 8 extends into the treatment vessel 6 through an outer wall of the treatment vessel 6 and is in direct communication with the tray assembly 4. The mid-portion of the chute 8 is inclined in a downward direction from the inlet 30 to the outlets 32. The mid-portion of the chute 8 diverges in a vertical direction from the inlet 30 towards the outlets 32. The outlets 32 are aligned vertically and extend from the lower end of the mid-portion of the chute in a horizontal direction. Each of the outlets 32 is in direct communication with a respective tray unit 14 and arranged tangentially with respect to the separator axis 16 (shown in FIGS. 3 and 4). In particular, the outlets 32 are in direct communication with the region between the annular lip 26 and the upper surface of the tray 18.

A plate 34, provided with a funnel section 36, is disposed within the base of the treatment vessel 6. The plate 34 extends horizontally across the extent of the vessel 6 and the funnel section 36 converges in a downward direction. The outlet 10 is provided in the lower region of the funnel section 36 and opens into a sump (not shown) below the vessel 6. The funnel section 36 is arranged coaxially with the separator axis 16.

The separator 2 may be part of a waste water treatment installation, and its function may be to separate grit and similar particles from a flow of waste water prior to further treatment processes.

During use, the treatment vessel 6 is flooded so that the tray assembly 4 is submerged. An influent mixture such as grit entrained by water is supplied though the chute inlet 30 and flows downwardly along the chute 8 and through the outlets 32 into respective tray units 14. The tangential arrangement of the outlets 32 causes the mixture to circulate within the tray units 14 about the separator axis 16.

The circulating flow is a relatively low energy flow which allows the entrained grit to settle on the upper surfaces of the trays 18. The sloped upper surface of each tray 18 causes the grit to gravitate towards the aperture 20 in the tray 18. The grit falls through the aperture 20 and is diverted radially outwardly by the conically shaped baffle 22 disposed above an underlying tray 18. The grit settles on the upper surface of the underlying tray 18 and gravitates towards and through the aperture 20 of the underlying tray 18. The grit passes over the successive baffles 20 and through the respective apertures 20 of the underlying trays 18 until it is expelled from the bottom of the tray assembly 4. The grit is then discharged from the treatment vessel 6 through the outlet 10, for example, to the sump (not shown) beneath the vessel 6.

The water from which grit is removed circulates within the tray units 14. The flow, a portion of which has a tendency to move upwardly through the apertures 20 towards the top of the tray assembly 4, is obstructed by the baffles 22. Agitation of the grit passing downwardly through the apertures 20 is thus reduced thereby improving grit retention within the tray units 14.

As the de-gritted water circulates within each tray unit 14 it flows upwardly over the annular lip 26 and over the rim 24 into the outer region of the treatment vessel 6. The annular lips 26 thus help to retain grit which has collected on the surface of each tray 18 within the tray units 14. De-gritted water which collects in the vessel 6 overflows through the outlet 12. The annular flow passage 28 provides a flow restriction which inhibits flow through the respective aperture 20. Restriction of flow through the aperture 20 increases the amount of de-gritted water which flows over the annular lip 26 and rim 24 into the treatment vessel 6.

Figure 6:
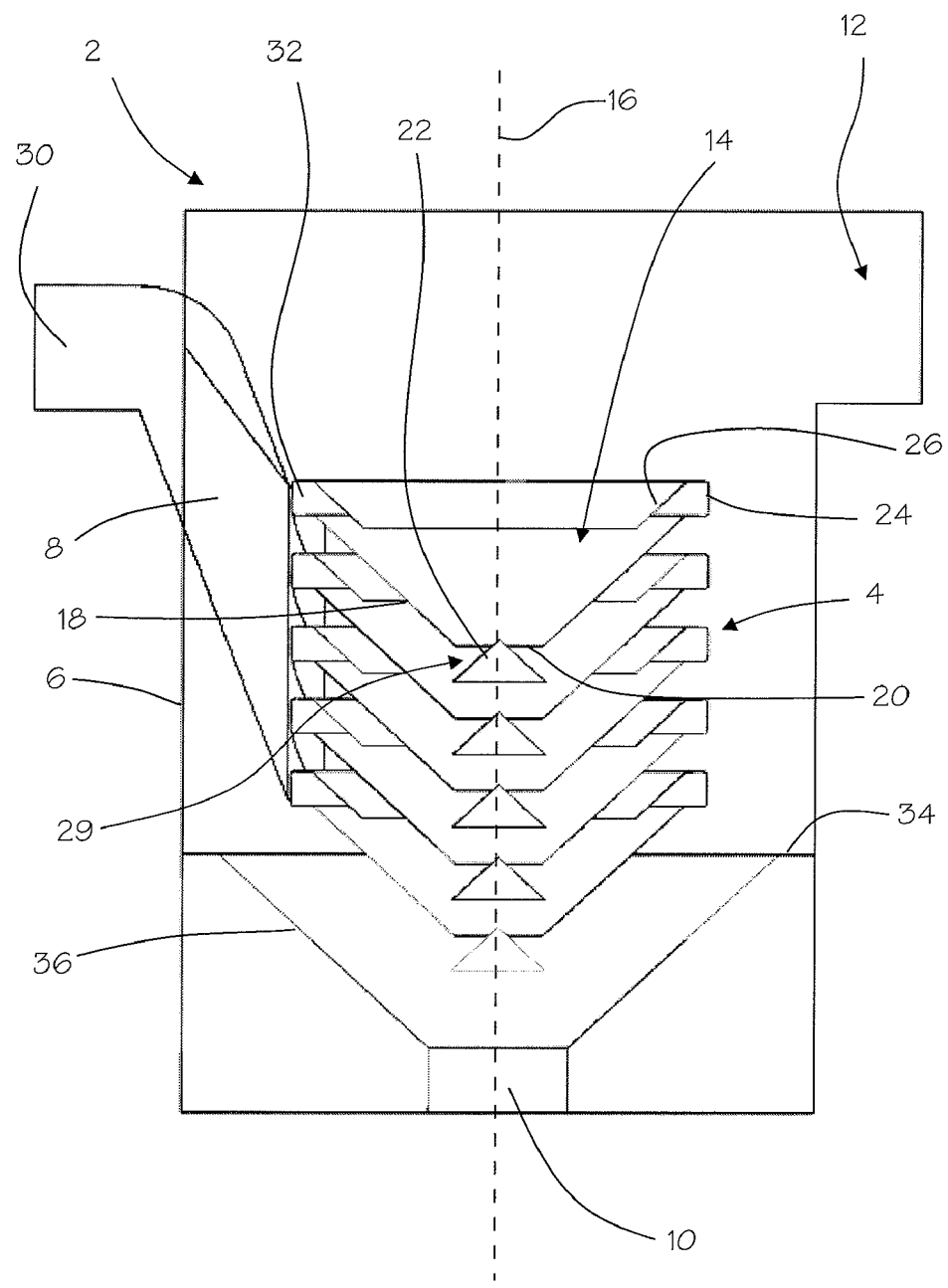

FIG. 6 shows a variant in which baffles 22 are disposed below respective apertures 20 in the trays 18. Each baffle 22 projects upwardly through the respective aperture 20. The flow area of the aperture 20 is the area in the plane of the aperture 20 which is unoccupied by the baffle 22 of the underlying tray 18.

Figure 7:
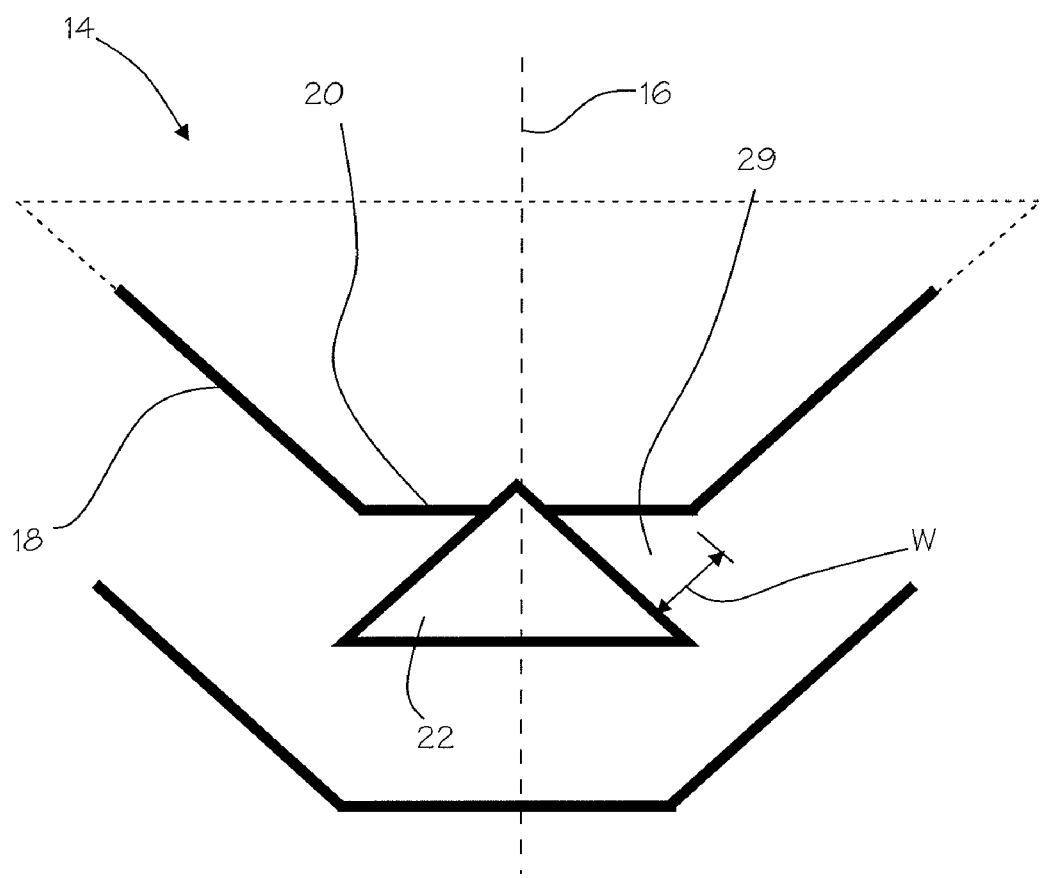
FIG. 7 is an enlarged partial sectional view of a tray unit of the separator shown in FIG. 6.

As shown in FIG. 7, each baffle 22 and respective tray 18 defines an annular passage 29 between the inner peripheral edge of the tray 18 and the conical external surface of the baffle 22. The width W of the annular passage 29 is measured perpendicular to the conical external surface of the baffle 22. The flow area of the passage 29 is the area of the passage across its width W. The flow area of the annular passage 29 is not greater than the flow area of the aperture 20.

It will be appreciated that other embodiments are possible. For example, a baffle 22 may be disposed both above and below each aperture 20. One or more of the baffles 22 may be a flat plate, or other shape suitable for restricting upward flow through the apertures 20. Furthermore, the baffle 22 may only partially overlap the aperture 20, for example, the diameter of the baffle 22 may be smaller than the diameter of the aperture 20. This would facilitate removal of the baffle 22 for maintenance access to the sump.

The funnel section 36 may extend across the full extent of the vessel 6, particularly where the vessel is cylindrical. The funnel section 36 would thus continue upwardly to the side walls of the vessel 6.

Figure 10:
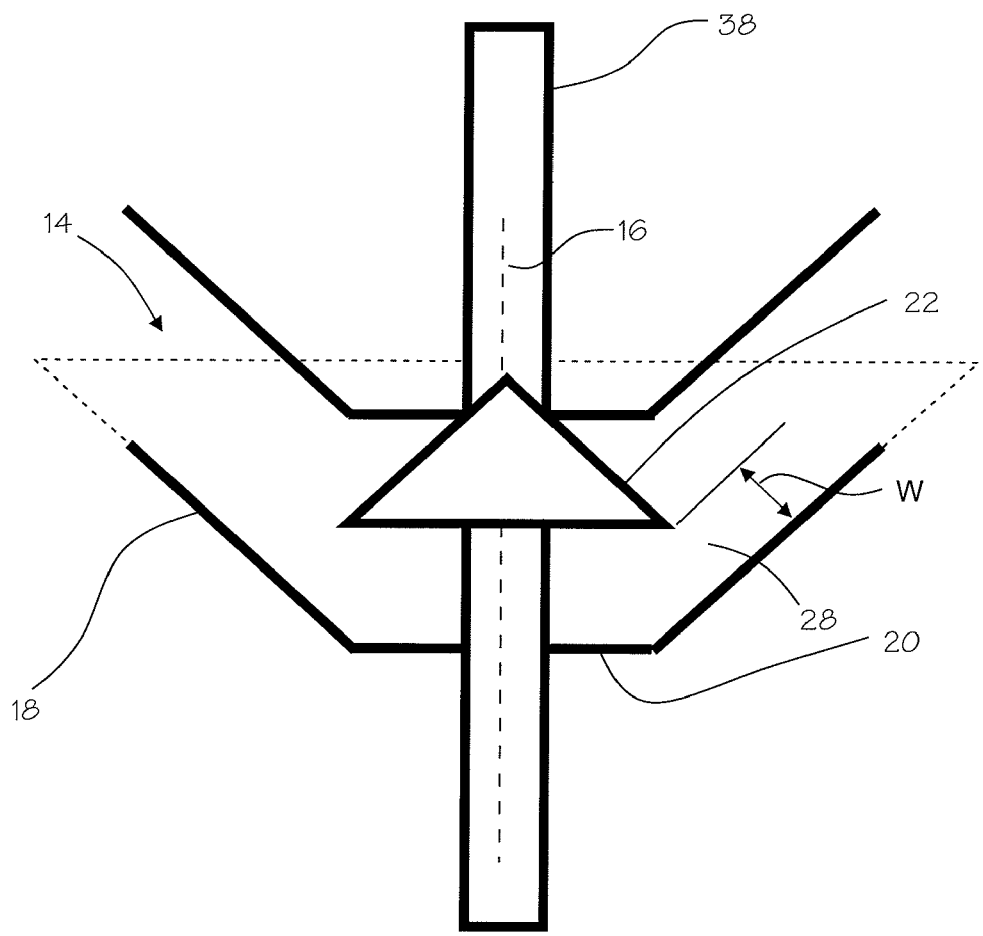

It will be appreciated that the baffles 22 may be supported independently of the tray units 14, for example, by a rod or pole 38, as shown in FIG. 10, extending along the length of the tray assembly 4. The rod 38 may be tubular to provide access to the sump, for example, to provide maintenance access for the removal of grit by a gully-sucker or pump connected to the rod.

Figure 8:
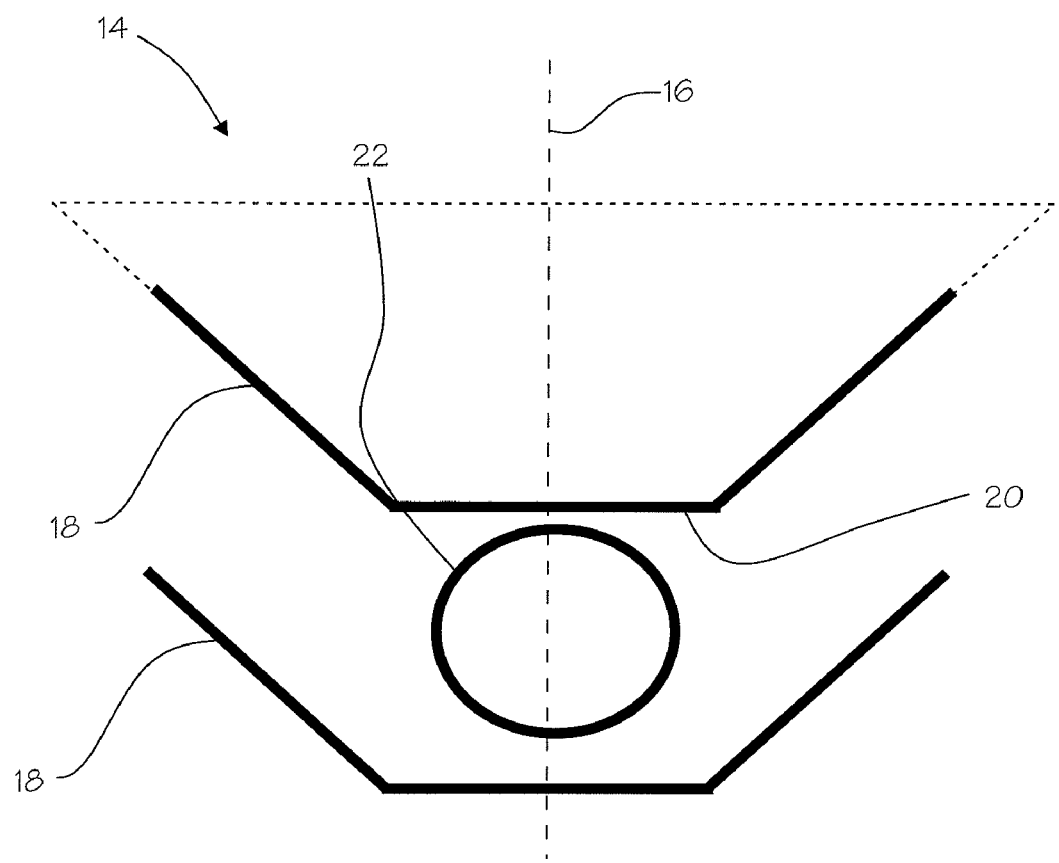
FIGS. 8 to 14 are enlarged partial sectional view of variants of the invention.

FIG. 8 shows a variant in which a spherical baffle 22 is disposed between adjacent trays 18.

Figure 9:
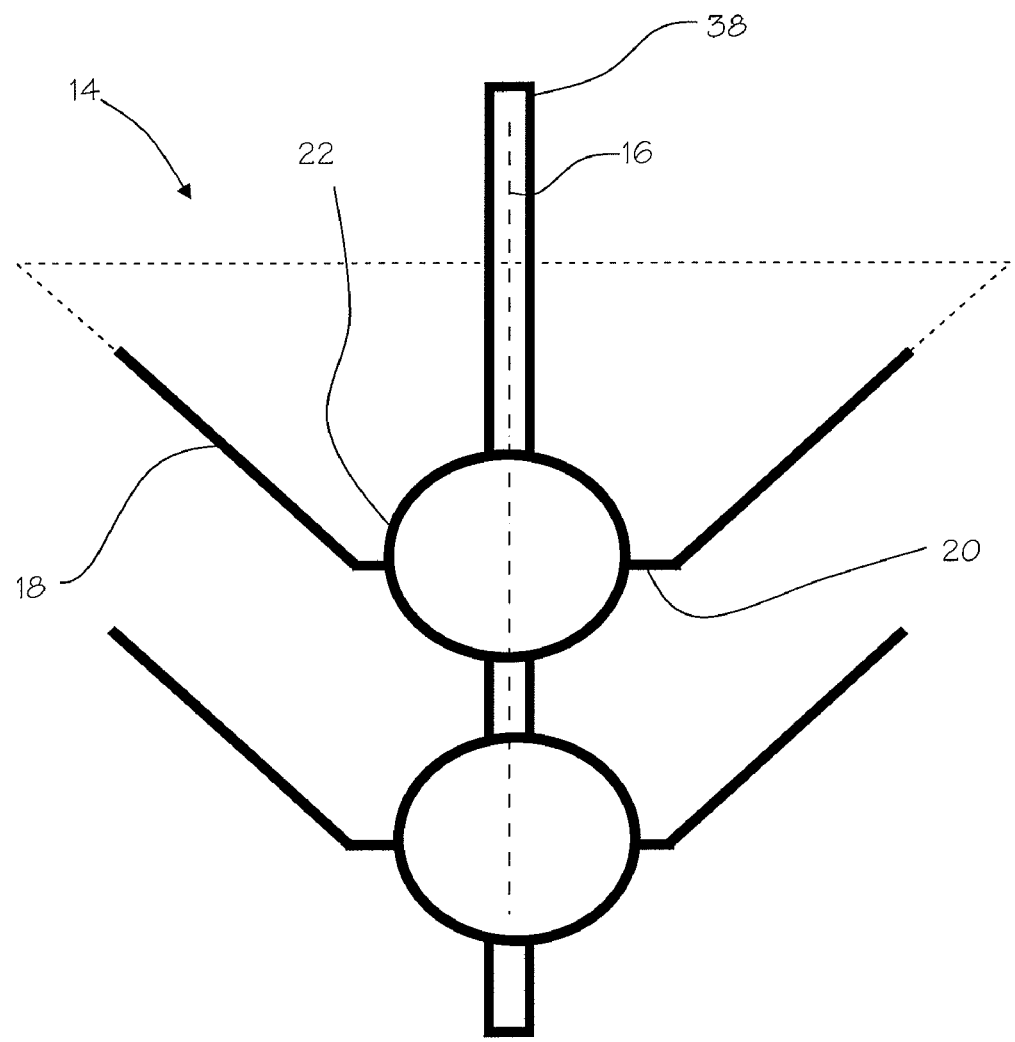

FIG. 9 shows a variant in which a spherical baffle 22 is disposed at the aperture 20 of each tray 18. The baffles 22 are suspended on a rod 38 which extends along the separator axis 16.

Figure 11:
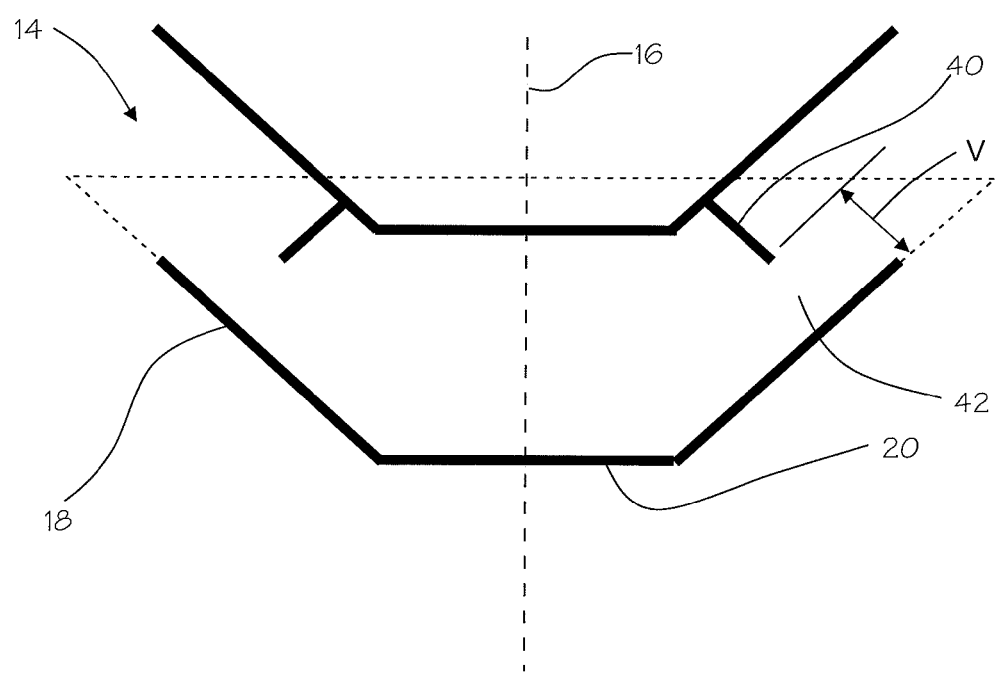

FIG. 11 shows a variant in which an annular baffle 40 projects from the lower surface of an upper plate of two adjacent plates 18. The baffle 40 projects in a direction which is perpendicular to the surface from which it projects. An annular passage 42 is defined between the outer peripheral edge of the baffle 40 and the conical inner surface of the lower tray 18. The width V of the annular passage 42 is measured perpendicular to the inner surface of the lower tray 18. The flow area of the passage 42 is the area of the passage across its width V. The flow area of the annular passage 42 is not more than the flow area of the aperture 20 in the lower tray 18. In use, the baffle 40 restricts radially inward flow thereby causing more water to flow over the rim 24 into the outer region of the treatment vessel 6.

Figure 12:
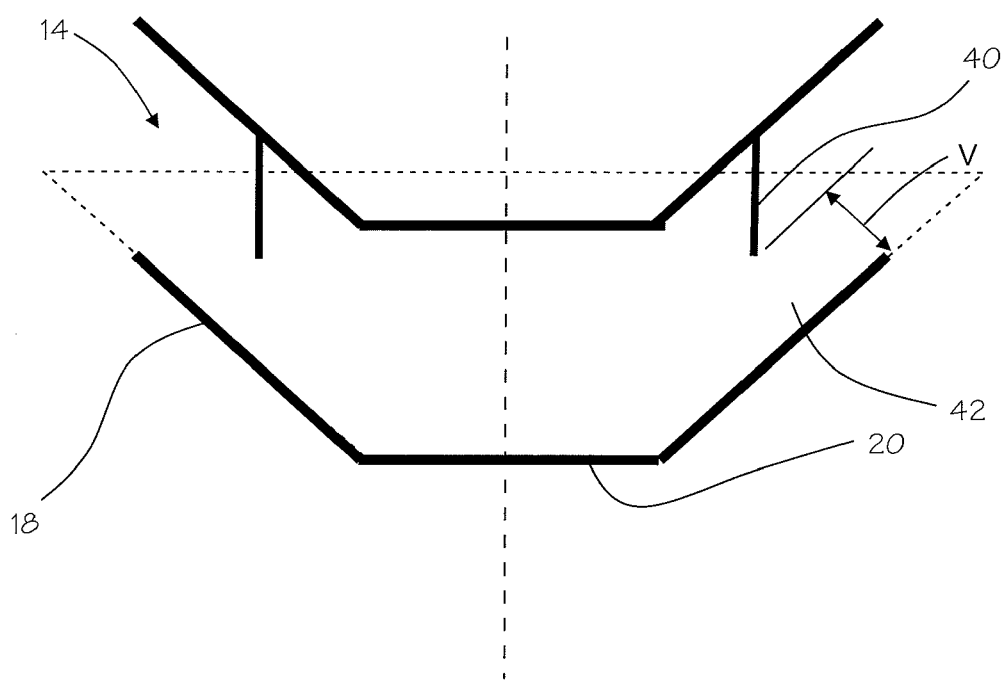

FIG. 12 shows a variant which is similar to that shown in FIG. 11 in which an annular baffle 40 projects from a lower surface of the tray 18 in a direction which is parallel with the separator axis 16.

Figure 13:
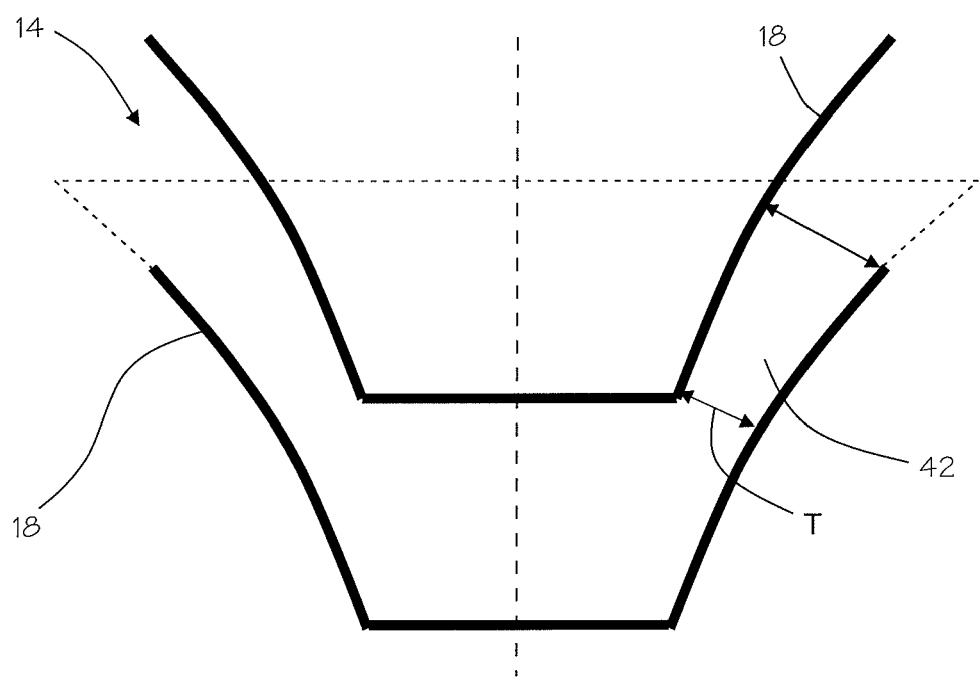

FIG. 13 shows a variant in which the conical section of each tray 18 is profiled to create a flow passage 42 between adjacent trays which converges in a radially inward direction. The profiles of the trays 18 are identical. The radially inner periphery of the upper tray 18 of adjacent trays and the upper surface of the lower tray 18 form a throat which defines the minimum flow area of the flow passage 42. The width T of the throat is measured perpendicular to the upper surface of the lower tray 18. The flow area of the throat is the area of the throat across its width T. The flow area of the throat is not more than the flow area of the aperture 20.

Figure 14:
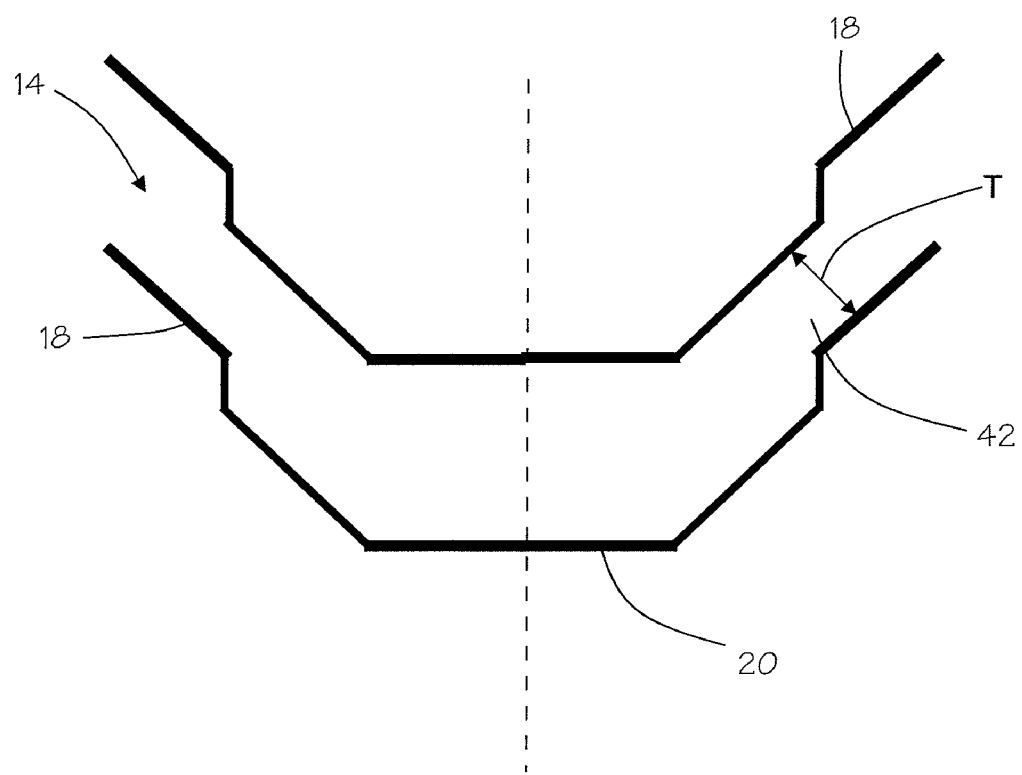

FIG. 14 shows a variant which is similar to FIG. 13, in which each conical section of adjacent trays 18 has a stepped profile having a radially outer portion which is raised with respect to the radially inner portion. The profiles of the trays 18 are identical. The throat is formed in the region in which the raised outer portion of the lower tray 18 overlaps the non-raised inner portion of the upper tray 18.

The invention claimed is:

1. A water treatment device comprising:
   a vessel;
   a separator for separating solids from a fluid, wherein the separator is disposed in the vessel and comprises:
      a tray assembly, the tray assembly comprising a plurality of nested tray units which define a separator axis and are spaced apart from one another along the separator axis, each tray unit comprising:
         a substantially conical tray which is aligned along the separator axis;
         an aperture in the tray disposed at the separator axis; and
         a restrictor which restricts flow through the respective aperture; and
      an inlet chute which extends into the treatment vessel through an outer wall of the treatment vessel, the inlet chute comprising a plurality of outlets, each outlet being in direct communication with a respective tray unit.

2. A device according to claim 1, in which the restrictor comprises a baffle.

3. A device according to claim 2, in which the baffle is arranged with respect to the conical tray to define an annular flow passage having a flow area which is not greater than the flow area of the respective aperture.

4. A device according to claim 3, in which the baffle is disposed on an upper tray of two adjacent trays and projects from an outer surface of the upper tray towards an inner surface of the lower tray thereby defining the annular flow passage between the outer peripheral edge of the baffle and the inner surface of the lower tray.

5. A device according to claim 4, in which the baffle projects in a direction which is perpendicular to the inner surface of the lower tray.

6. A device according to claim 4, in which the baffle projects in a direction which is parallel with the separator axis.

7. A device according to claim 2, in which the baffle is disposed at or adjacent the aperture.

8. A device according to claim 7, in which the baffle of each tray unit is disposed below the respective aperture.

9. A device according to claim 7, in which the baffle of each tray unit is disposed above the respective aperture.

10. A device according to claim 7, in which the baffle of each tray unit is disposed such that it projects through the respective aperture.

11. A device according to claim 7, in which each baffle has a conical external surface and each tray has an inner peripheral edge defining the aperture, the inner peripheral edge of the tray and the conical external surface of the baffle defining the annular flow passage.

12. A device according to claim 11, in which the flow area of the annular passage is measured in a plane perpendicular to the conical external surface of the baffle.

13. A device according to claim 7, in which each baffle has an outer peripheral edge and each tray has a conical inner surface, the outer peripheral edge of the baffle and the conical inner surface of the tray defining the annular flow passage.

14. A device according to claim 13, in which the flow area of the annular passage is measured perpendicular to the conical inner surface of the tray.

15. A device according to claim 7, in which the baffle of each tray unit is spherical.

16. A device according to claim 7, in which the baffles are suspended by a rod that extends along the separator axis.

17. A device according to claim 16, in which the rod is tubular.

18. A device according to claim 2, in which the baffle of each tray unit is conical.

19. A device according to claim 18, in which each baffle converges in a direction opposite to the direction of convergence of the respective tray.

20. A device according to claim 18, in which each baffle comprises a hollow cone having an open base.

21. A device according to claim 1, in which the restrictor comprises a profiled section of the tray which is arranged with respect to an adjacent upper tray to define an annular flow passage between the trays, the annular passage having a flow area which is not greater than the flow area of the respective aperture.

22. A device according to claim 1, in which the tray assembly axis extends upwardly and in which each tray converges in a downwards direction.

* * * * *